Aug. 8, 1939.  L. E. PERRINE  2,168,744
VARIABLE SPEED DRIVE
Filed March 11, 1936  3 Sheets-Sheet 3

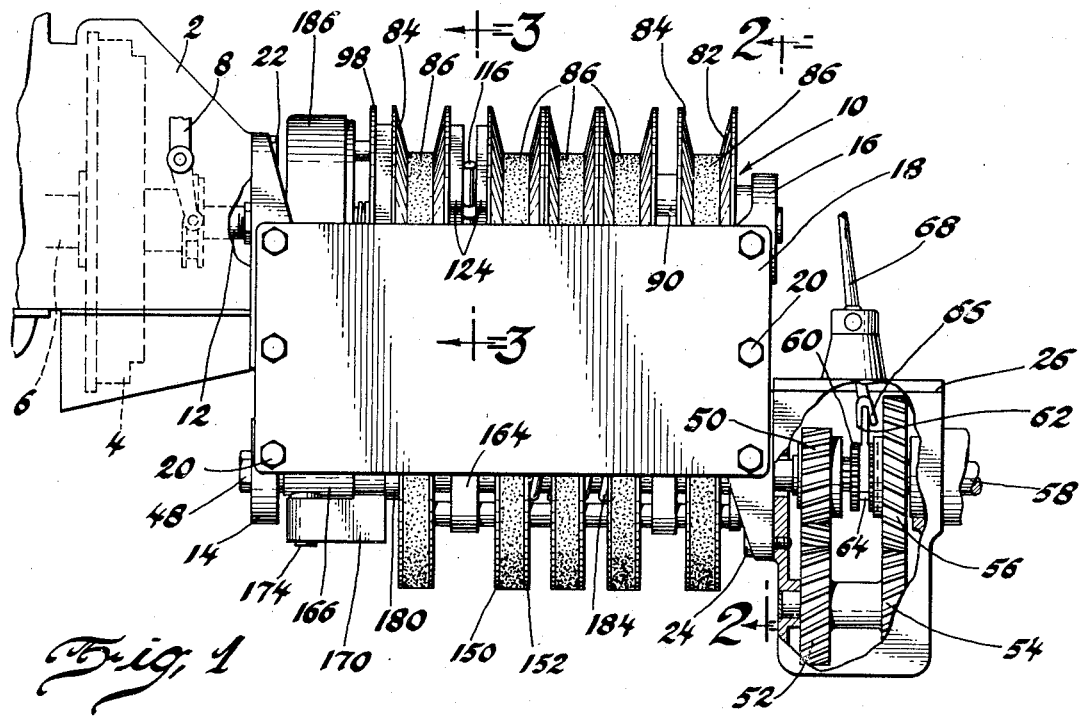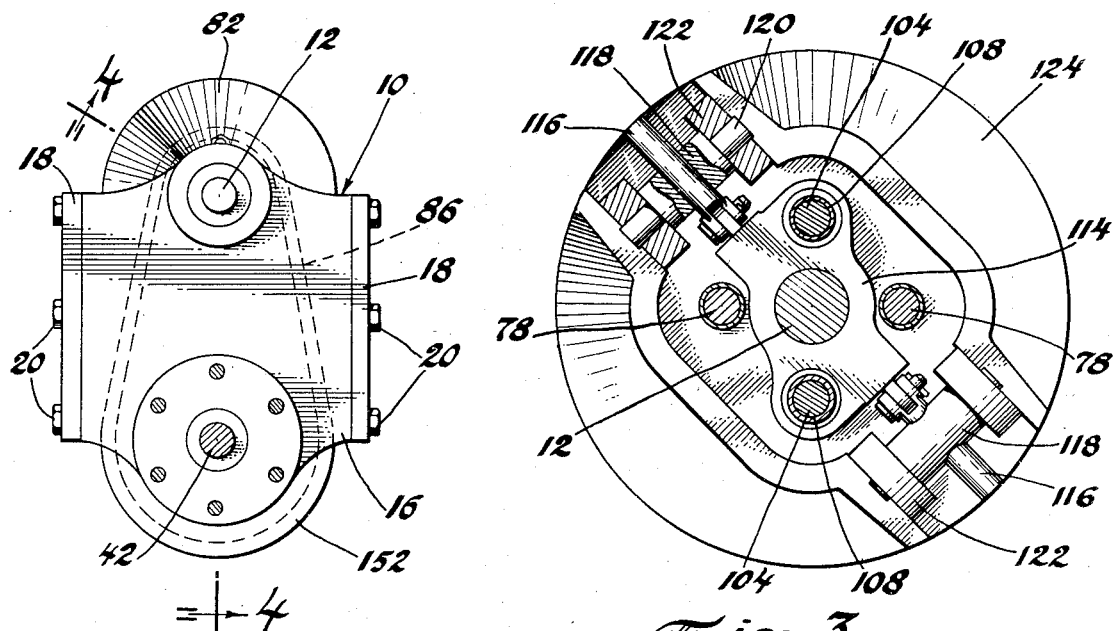

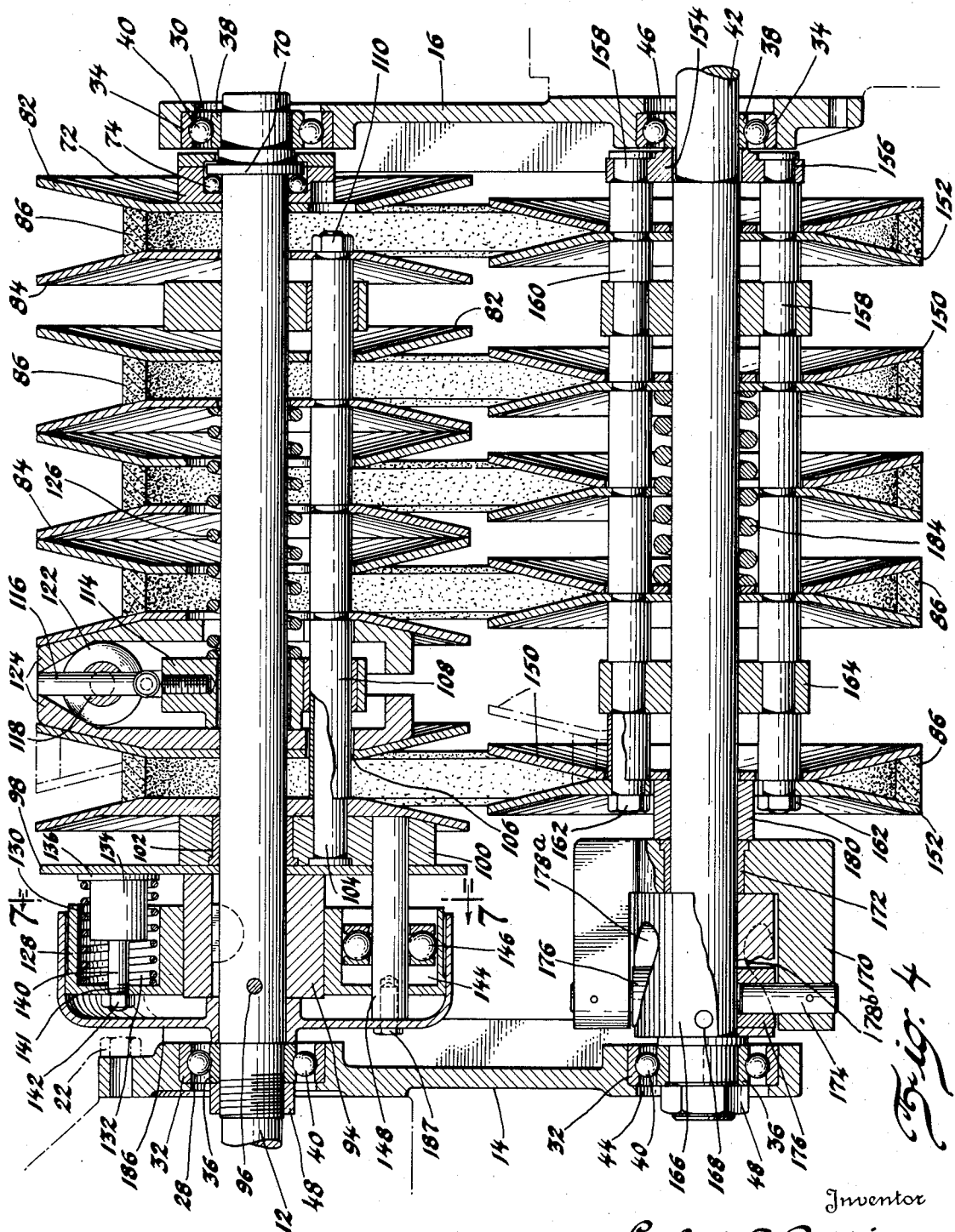

Inventor
Lester E. Perrine
By Blackmore, Spencer & Flint
Attorneys

Patented Aug. 8, 1939

2,168,744

UNITED STATES PATENT OFFICE 2,168,744

VARIABLE SPEED DRIVE

Lester E. Perrine, Detroit, Mich., assignor to General Motors Corporation, Detroit, Mich., a corporation of Delaware Application March 11, 1936, Serial No. 68,153

16 Claims. (Cl. 74—230.17)

This invention relates to power transmission mechanism and more particularly to power transmission mechanism in which the ratio between the driving and driven members is changed automatically dependent on the various conditions.

In previous instances it has been the practice to have gears of different ratio between a driving and a driven shaft with suitable manually operated means for engaging or disengaging the various gears. I have provided in my copending application, Serial No. 746,205, filed September 29, 1934, an automatic ratio varying transmission and the present application is drawn along similar lines and may be considered to be an improvement over the former.

The general construction is a plurality of endless belts entrained between pulley sides on two parallel shafts, one driving and one driven, the effective diameters of the pulleys changing by having one movable pulley side. There are on the two shafts a plurality of control means that are automatically operated and all of which have the same tendency, that to force the movable pulley sides toward the non-movable and thus to increase the pulley diameter. Of course under different conditions it is evident that certain of the controlling or actuating means must dominate over the others since the one set of pulleys must contract as the opposite set expands, and in some instances some of these devices may tend to open pulley sides.

There are in the main, five controlling members in my transmission. On the drive shaft there is a spring, a speed governor, and a preloaded torque-conscious member for controlling the ratio change and on the driven shaft there is a spring, heavier than the first mentioned spring, and a torque loading device, the latter torque loading mechanism being dominated by the former torque loading device under certain conditions. Through these five control means which are all self-contained in the transmission, the ratio is automatically changed with no outside control factor necessary.

It may be stated that this particular form of my invention is designed to give a ratio of from .5 to 1.5 which in an automobile would approximate second gear speed to overdrive. This, of course, is intended in no limiting sense as the ratios may easily be changed by selection of pulley diameters.

The main object of my invention is therefore to provide a self-contained, automatically variable transmission.

It is a further object to provide such a transmission utilizing flexible driving belts.

It is a still further object to provide control means for the transmission, all of which tend to maintain the belts taut to eliminate breakage and excessive wear of the belts.

With the above and other objects in view which will become evident as the description proceeds, my invention resides in the embodiments described in the following specification and claims and illustrated in the accompanying drawings, in which:

Fig. 1 is a side elevation of a transmission embodying my invention connected to adjacent driving apparatus of an automobile, parts being broken away.

Fig. 2 is an end view of the transmission being a sectional view taken on line 2—2 of Fig. 1.

Fig. 3 is a sectional view taken on line 3—3 of Fig. 1.

Fig. 4 is an enlarged longitudinal section through the transmission on line 4—4 of Fig. 2.

Figure 5:
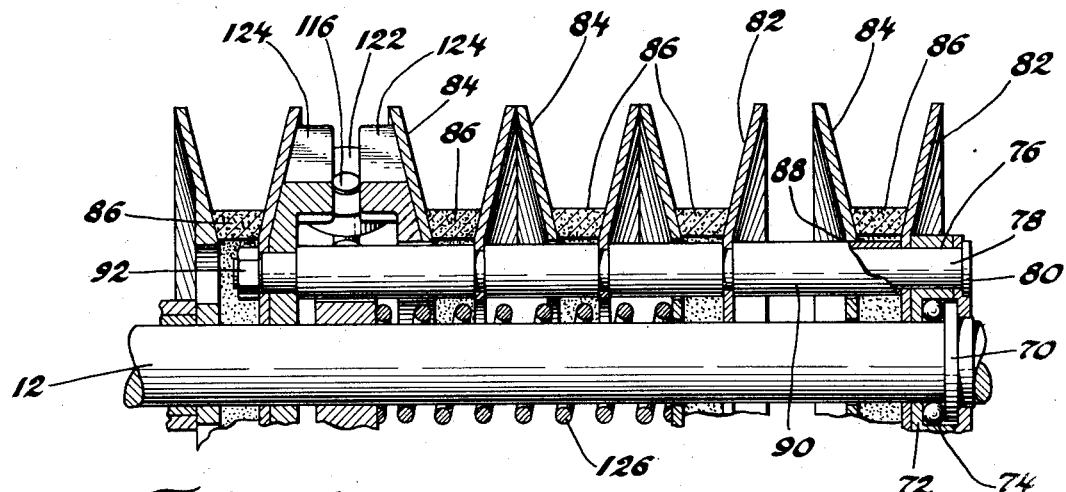
Fig. 5 is a partial horizontal section taken through the upper or drive shaft.

The particular installation shown in Fig. 1 illustrates the rearward portion 2 of the crankcase of an internal combustion engine assembly within which the clutch 4 is located which is connected to the end of the crankshaft 6. A clutch operating arm 8 is pivoted to the portion 2. Mounted directly to the rear of this portion is the automatically variable transmission, generally designated at 10, the upper or drive shaft 12 of which extends into the crankcase and is operatively connected to the clutch.

The housing of the transmission comprises two end plates 14 and 16 secured rigidly together in spaced relation by two side plates 18 held thereto by bolts 20. The forward end plate is bolted to the rear face of the crankcase by bolts 22 and to the rear face of the rear end plate is secured by bolts 24 a housing 26 for speed change gears, later to be described.

In the upper portion of the front and rear end plates are a pair of aligned openings 28 and 30 within which are press-fitted the stationary halves 32 and 34 of ball races, the rotating halves 36 and 38 being secured to shaft 12 and ball bearings 40 being held in each instance between the two.

Below shaft 12 and parallel therewith is a driven shaft 42 which is supported in the end plates in the same manner as shaft 12, like reference characters being applied to the bearings in the openings 44 and 46. This shaft 42 is threaded at its forward end and carries a nut 48 thereon to secure the ball race 36 to the shaft and the shaft in place. The opposite end of the shaft projects into the housing 26 and has secured thereon a gear 50. Various speed change and reversing gears 52, 54 and 56 are mounted within the housing, the gear 56 being mounted on the main vehicle drive shaft 58 which extends through the housing to the rear for driving the vehicle. Between the gears 50 and 56 is located a horizontally slidable compound gear 60 having a projecting member 62 thereon which takes the form of a yoke acting in a groove 64, the upper end of which engages a notch 66 in the end of a pivoted shifting lever 68 whereby this gear may be shifted and the gears may be driven in any desired combination.

Adjacent the rear extremity of the shaft 12, as in Figure 5 spaced immediately inside the rear end plate 16 is an integral collar 70, and around this collar 70 there is clamped a two-piece hollow round box 72 end portions of which approach the shaft surface on opposite sides of the collar 70 and within the hollow portion of which there is also maintained a series of ball bearings 74. This member 72 has two diametrically opposite openings 76 therethrough to accommodate a long rod 78, the end portion of which is enlarged to form a head 80 to prevent the rod from sliding entirely through the member 72. The axes of this rod 78 and a similar rod which is spaced on the opposite side of shaft 12 (not shown) is parallel with that of the shaft 12 and the purpose of these two rods is to maintain in axially fixed relation the suitable non-movable divergent or tapering sides 82 of a series of tapered flange pulleys carried by the shaft 12. The opposite or movable sides of the pulleys 84 also diverge to form between the two sides 82 and 84 a V-shaped trough within which runs a friction energy transmitting belt 86 whose cross section is trapezoidal.

The movable pulley sides 84 have therein openings 88 through which the rods 78 project and may slide freely thereon, the rods 78 carrying between adjacent non-movable sides 82, spacing sleeves 90 to keep the non-movable sides in correct relation and having the opposite end of the rod 78 threaded and carrying a nut 92 on the forward face of the last non-movable pulley side 82, the tightening of which maintains all of the non-movable sides in assembled relation.

Figure 8:
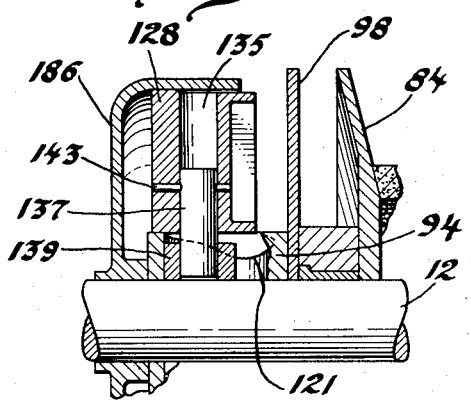
Fig. 8 is a sectional view taken on line 8—8 of Fig. 7.

Upon the forward end of the shaft 12, adjacent the front end plate 14, there is rigidly secured a portion 94 of a torque device by a suitable pin 96 or by a key such as shown unnumbered. Immediately to the rear of this member 94 the shaft carries a circular movable disk 98 as shown in Figure 8 and adjacent that an irregular spacing and supporting member 100, the latter having a central bearing 102. Adjacent the shaft in the member 100 there are a plurality of axially extending carrying rods 104 similar to rod 78 but circumferentially spaced at 90° therefrom, these rods projecting through openings 106 in the non-movable pulley sides but connected to the movable pulley sides to cause axial movement of the latter under certain varying conditions. The rods 104 are in substantially close contact with the openings in the non-movable pulley sides and extending between adjacent movable pulley sides are sleeves 108 to space said pulley sides correctly, as in the former instance, and the rearward end of the rods 104 is threaded for a supporting nut 110 which is adapted, when tightened, to hold all the pulley sides in a substantially rigid assembly.

Between the first and second pulleys, on the shaft 12, and taken from left to right, there is secured for rotational and axial movement a member 114 through which also project shafts 104. Element 114 has a running fit with respect to shaft 12 so that it may adjust axially for small accommodation movements; however, in practise, it is not necessary that 114 move axially since pivoted weights 122 on spindles 116 may rock freely in contacting the inner faces of their races 124. In practise, element 114 may be actually attached to one of the adjacent flanges 82 or 84 without impairing the operability of the mechanism as a whole. In the drawings, Figures 3 and 4, shafts 104 both pass thru member 114 such that the latter rotates with the movable flanges 84, a small bushing not numbered, fitting over the shaft sleeve 108, so that whatever axial movement is required, may be had. Carried by this member 114 in pivotal relation thereto are two oppositely disposed pins 116 which extend out to substantially the same diameter as the pulleys. Slidably carried by the pins 116 are stub shafts 118 which have a diametrical opening therethrough, the outer ends of the stub shafts 118 being of reduced diameter, as shown in 120, to carry rollers 122 on each end. It will therefore be seen that as the rotary speed of the shaft varies, the stub shafts and rollers will be thrown out by centrifugal force to different diameters, depending upon the speed, and they are adapted to run on tracks or races 124 which are secured to the movable and non-movable sides of adjacent pulleys as best shown in Fig. 4. Surrounding the shaft 12 and bearing against the member 114 and the movable side of the next to the last pulley, is a helical coiled spring 126 which is normally under compression and tends to press the movable side of this pulley toward the non-movable and since all movable sides are connected together it would have the same effect on this group. It should also be noted that the effect of the governor as the speed increases is also to effect the same result, i. e., of forcing the movable toward the non-movable to increase the effective diameter since, as the rollers 122 are forced outwardly by centrifugal force, they will bear against the left hand track which is stationary and after the two start to approach each other they will force the movable track 124 on the right hand pulley to be moved toward the right as will be understood from inspection of Figure 4, this rightward force is transmitted thru rods 104 to the other movable pulley flanges 84.

Considering now particularly the structure of the torque-conscious member at the extreme left or forward portion of the upper shaft 12 in Fig. 4, the member 94 affixed to shaft 12 has therein a plurality of diametrically spaced cam grooves 121 best shown in Fig. 8. Surrounding the outer periphery of the member 94 and free to slide thereon is an annular member 128 which has therein a plurality of circular openings 130 extending parallel to the axis of shaft 12 but which do not extend entirely through the member 128. Within each of these openings, which are spaced in this instance 90° apart throughout the annular member 128, there is supported a short cylindrical member 134, whose outermost face is enlarged to form a stub collar 136 which may bear endwise on the adjacent flange 98 causing spacer 100 and parts connected to rods 104 to move to the right when pressure from the torque of shaft 12 is applied to member 128. Integral with the inner end is a bolt portion 140 which is slidable within an opening 141 in the thin portion of the member 128. The end of the bolt portion is threaded to receive a nut 142. A helical spring 132 surrounds the cylindrical member 134 and bears against the collar portion 136 and against the base of the opening 130. In this manner, pressure on the face of the cylindrical members will compress the springs 132 and the bolt portion 140 will move through openings 141 to the left. The nuts 142 act as stops and also for any adjustment on the tension of the springs 132 as they are normally preloaded.

There are also a plurality of diametrically opposite hollow cylindrical openings 144 in the member 128 in which are carried ball bearing assemblies 146 which surround one end of a pin 148 which projects thereinto, which pin is slidingly supported on its other extremity in the member 100 rigidly secured to the movable side 84 of the first pulley and to rods 104 as shown in Figure 4. These pins act as guide pins for horizontal movement of the member 128. The bearings 146 are affixed in member 128 to permit axial motion only of rods 148.

Extending diametrically through the member 128 between openings 130 are two radial openings 135 within which are located stub shafts 137 carrying on their inner extremities rollers 139 for engaging the cam surfaces 121 on the member 94. The stub shafts are secured within the openings 135 by pins 143.

It will thus be obvious that under certain torque conditions, later to be described, the cam surfaces 121 will force the rollers to the right, as viewed in Figs. 4 and 8, said rollers through the stub shafts forcing member 128 and cylindrical members 134 to the right, the latter acting on the plate, which action, transmitted through the rod 104, tends to make the movable pulley sides approach the non-movable to give a larger effective pulley diameter.

As shaft 12 and cam sleeve 94 rotate under engine torque; roller 139 on shaft 137 fixed in member 128 moves axially, transmitting the axial force thru springs 132 resting on seats in spindle 134, tending to cram flanged piece 98 to the right. This action thru spacer 100 is applied to rods 104, causing each of the moving flanges 84 to shift to the right, as in Figure 4.

At the same time, the rotational force applied thru shaft 12, cam 121 of sleeve 94, to rollers 139, and spindles 137 of member 128 is delivered from 128 thru pins 148 to spacer element 100, driving rods 104 and their affixed movable flanges 84. The ratio control action is transmitted thru one group, responding to torque, and the actual torque is sustained by the other group.

Upon the second shaft or the driven shaft there are located a plurality of movable and non-movable pulley sides 150 and 152 respectively. There is mounted on the right hand end of the shaft within the transmission a rotatable circular member 154 which has a plurality of diametrically spaced openings 156 therein through which project a portion of two parallel rods 158 similar to the rods 78 upon the shaft 12. These rods also have thereon a plurality of spacers 160 to correctly space the non-movable sides 152 from each other the whole assembly being secured together to nuts 162 on the opposite ends of the rods. There are also located at various intervals along the rods 158 a plurality of stabilizing members 164 which extend between the two rods and around the shaft 42.

Secured to the left hand end of the shaft 42, as viewed in Fig. 4, is a cylindrical cam member 166 which is non-rotatably secured to the shaft in any desired manner such as pin 168. Slidably and rotatably surrounding the shaft is a substantially U-shaped member 170 secured to bearing 172, the central portion carrying the bearing 172 attached to bushing 180 adjacent the shaft and the two extending arms of which surround the cam member 166 and carry at their extremities two pins 174 which project radially from the shaft 42 to carry rollers 176 which lie within the cam surfaces 178 of the cam member 166. Comparing the cam surfaces 178 with the previously mentioned cam surfaces 121, both have the same lead on one side, that is effective if the motor is running slower than the wheels or when braking is occurring, but cam 121 has a higher lead on the opposite surface or when the motor is actually driving. This is to provide an engine torque effect capable of negotiating the shift to overspeed ratio when the engine is developing three-quarters to full torque.

Immediately to the rear of the member 170 is the attached bushing 180 which is secured to the movable pulley sides through engagement with one end of a rod 182 which is similar to the rod 104 on shaft 12. This rod extends through the non-movable sides 152 and is connected to the movable pulley sides 150 in like manner to that before described so that all movable sides will be moved in unison. Concentric with and surrounding the shaft 42 substantially at its center in the transmission is a helical coil spring 184 which extends between one of the movable and a remote non-movable side, its action being to force the movable toward the non-movable to enlarge the effective diameter of the pulley and since, as before mentioned, all the movable sides are connected in unison, it will have this effect on the whole group. In Figure 4 spring 184 bears against non-sliding flange 152 of the second pair from the right, and loads against unnumbered bushing collar of movable flange 150 of the second pair from the left, so that the force of the spring is exerted thru rods 182 on all of the flanges 150 in a leftward direction, tending to squeeze the pulleys all together, to urge the belts 86 to a higher diameter position, at all times.

It should be noted that this spring 184 is substantially larger and heavier than the spring 126 on the shaft 12 and therefore, other conditions being equal, would dominate the same. It may also be mentioned that the torque cam 166—170 will, under heavy load conditions on the driven shaft, dominate the springs 132 in the torque-conscious device on the drive shaft 12.

Figure 6:
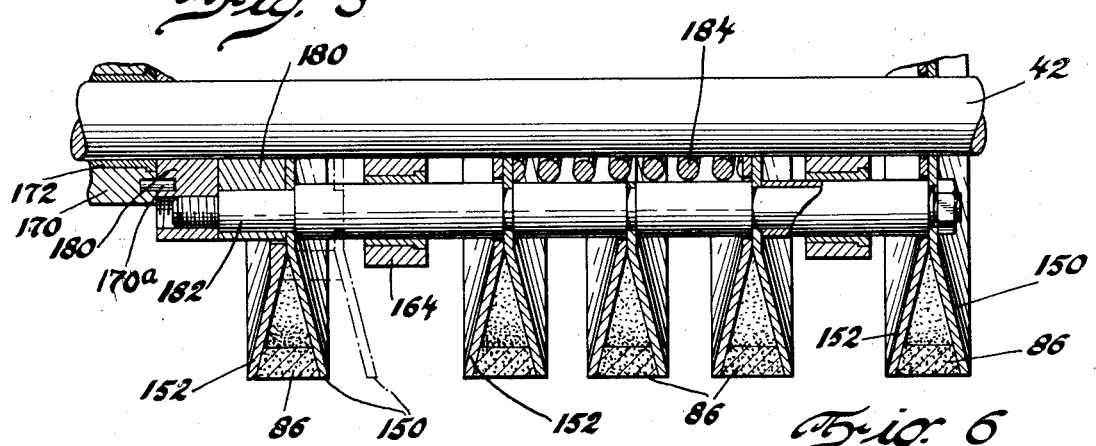
Fig. 6 is a partial horizontal section taken through the lower or driven shaft.
Figure 7:
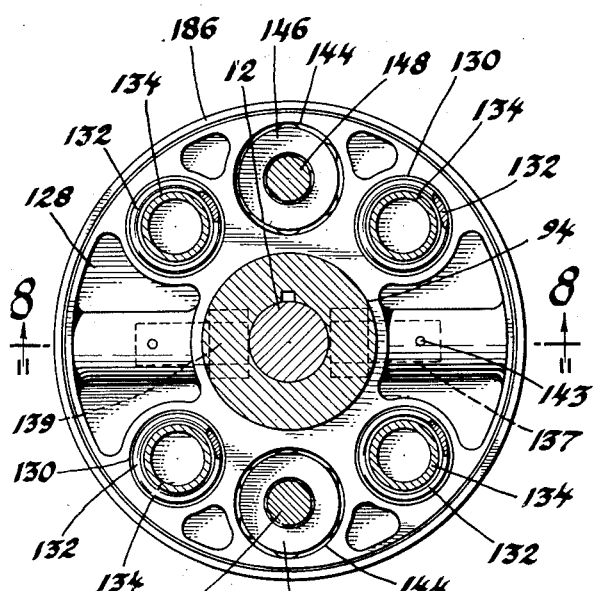
Fig. 7 is a sectional view taken on line 7—7 of Fig. 4.

Surrounding the member 128 with only a small clearance between the two is a bell-shaped member 186 shown in Figure 8 as mounted for rotation on the shaft 12 and connected to pins 148, the latter projecting thru apertures in member 128 and having bolts 187 threaded to lock pins 187 to bell 186 for rotation therewith, the function of the bell being to act as a dashpot when the member 128 is suddenly released such as when the accelerator in the car is released and the engine acts as a brake instead of for driving purposes. Under these conditions the member 128 will tend to shift suddenly to the left, as shown in Fig. 4, with considerable force due to the action of the spring 132. However, the bell-shaped member 186 forms an air dashpot with the outer surface of the member 128 and tends to dampen this motion. Member 164 supports rods 158 and 182 against torsional misalignment, and is bushed to permit axial sliding of rods 182. Rods 158 are fixed against sliding motion as shown in Figure 4. Element 154 is free to rotate on shaft 42, and supports the ends of shafts 158, the opposite ends of 158 being fixed to flange 152 as shown in Figure 4. The shafts 182 are mounted as shown in Figure 6, fixed at the right to flange 150, and to the intermediary flanges 150, and at the left in flange 150 and member 180 attached to body 170.

The element 170 supports pins 174 with their rollers 176. Slotted cam member 166 is pinned at 168 to shaft 42, and constitutes the sole torsional connection between the shaft and the driving assembly of parts. Load torque is felt at the contacts of rollers 176 and cam slots 178, causing the movable flanges 150 to tend to shift toward the left of Figures 4 or 6, expanding the belts 86 to larger diameters.

As before mentioned, it should be here noted that all of these different control devices, i. e., the speed governor, the two helical springs and the two torque-conscious cam devices, all tend to force the movable toward the non-movable sides to give the largest effective pulley diameter. This particular feature is designed so that the pulley belts may always be kept taut and so that they may not come loose and be broken. The operation of the device is as follows:

With the apparatus in the position as shown in Fig. 4, the pulleys on the upper shaft 12 are expanded to give their smallest belt diameter and in this position the transmission will transmit the greatest value of torque and consequently the lowest speed. As the shaft 12 revolves the cam members in the torque-conscious device 128 on the drive shaft 12 are forced to the right which causes the member 128 to move axially to the rear but does not compress springs 132 until sufficient pressure is produced by the torque loading action to overcome the preloaded pressure of the springs. This torque-generated pressure in turn forces the stub members 134 to the right which results in a movement of plate 98 to the right and through force transmitted by the rods 104 to spacer 100 forces the movable sides 84 toward the non-movable sides 82 which forces the belts 86 outwardly in the upper set of pulleys to increase the speed ratio. This, of course, occurs only under normal conditions in load, such as in a car running with reserve engine power on the highway. At the same time the springs 126 tend to assist in the upshift action and as the engine speed increases the governor rollers 122 tend also to assist in the same upshift action, so that under normal increased acceleration conditions the belt is forced outwardly in the upper set of pulleys. This tends to overcome the spring 184 in the lower set of pulleys and expand the same, since the belts being all of unitary circumference immediately diminish in diameter on the pulleys 150—152, when their force available exceeds that of spring 184. If the load on the car is only normal, the belts will eventually under increased throttle, or under down gradient conditions reach their outmost position on the upper set of pulleys and likewise as explained above, reach their innermost position on the lower set of pulleys since the ratio shift control factors derived from the power and speed of the upper shaft 12 will overcome the expansive forces on the lower spring 184 and in this particular apparatus the vehicle will be driven in overdrive ratio, or a ratio of about 1.5. If, however, the load upon the vehicle increases and the shaft 42 tends to drag or lag behind the member 170 and connected parts by angular increments, the rollers 176 will move over the cam surfaces 178a of slot 178 to force the movable sides 150 toward the non-movable sides 152 and increase the diameter on the lower set of pulleys. As before mentioned, this cam 178 has sufficient mechanical advantage to dominate the above mentioned ratio control factors on the upper shaft because the preloaded springs 132 yield and permit the driver pulleys 82—84 to expand under action of the belts 86 and the speed ratio will be decreased to take care of this additional load torque.

It might also be mentioned that this transmission has been designed to eliminate the use of a servo vacuum control which has heretofore been utilized in similar transmission so that this transmission might be used with a two-cycle engine. The particular advantages of this transmission are, first, that it provides a low ratio for starting or low speeds due to the fact that the spring 184 is strong enough to dominate the other forces at rest or slow speeds and forces the transmission into the position shown in the drawings. Second, in the use of higher ratios for light loads at low speeds, the governor and driver cam, i. e., the cam 121 acted on by rollers 139 spindled to the member 128, are effective to increase the input drive pulley sizes and thus increase the speed ratio. This is due to the fact that the cam 94 has a lead or helical angle less than the driven cam 178 so that it tends to compress the driver pulleys 82—84 and overcomes the force of the driven cam 178 and the driven shaft spring 184. The governor 122 aids in this action but has a small force at low engine speeds. It should be noted in this arrangement that there is a ratio shift tendency toward overdrive at light loads with low speeds when driving ordinary load torque requirements.

Third, in providing overdrive at high vehicle and engine speeds the transmission is designed so that the governor 122 will exert a sufficient force to dominate all other forces acting on the pulley sides and to hold the transmission in high ratios during the maintenance of these conditions.

Fourth, in order to provide low ratios for heavier loads such as for acceleration or hill climbing, this particular function is provided by the particular construction and application of the preloaded spring 132 in the cam operated member 128. As before mentioned, this spring 132 is preloaded and in this particular example to about 200 pounds pressure and is held against complete expansion by the nut 142 on the end of the bolt portion 140. When enough torque is applied so that the separation action of the belts 86 on the driver pulleys 82—84 has considerable force due to the cam action of the driven shaft cam 166 having surfaces 178 and also thru the force of the dominating spring 184, then the springs 132 tend to compress and yield permitting the driver pulleys 82—84 to open and the driven pulleys 150—152 to compress due to the cam action. This results in a low ratio for heavier loads and low speeds.

Fifth, the ability of the transmission to change from high ratio to low and from low to high when a heavy load is suddenly applied is obtained by predetermining the initial preloading of the spring 132 so that it may compress readily with the application of heavy loads. Of course it is obvious that this preloading may be set at any desired point as described preceding.

Sixth, in order to provide light torque at low speeds and low ratio as would be the case where the operator might be parking the automobile, the following will apply. The transmission controls will fulfill this requirement due to the fact that under these conditions there is a substantial balance of forces between the action of spring 184 and the driven cam 178 on the one hand and the action of the cam 121, speed governor 122 and spring 126 on the other hand. The nearer the torque requirements balance the difference between these two sets of forces the smaller will be the incremental forces present acting to change the ratio. These transmission controls are also capable of holding nearly constant ratio on deceleration. This is primarily intended to eliminate a lack of engine braking when the throttle is closed. The reverse cam surface 178b is designed to meet this requirement since it may have leads which tend to produce underdrive on reverse torque and with no other large forces available the ratio would tend to be controlled by these cams on both driving and driven sides. These cams may however be designed to hold the ratio fixed on reverse torque or to permit a scalar differentiation between the driving torque and overtaking torque effects on ratio, to meet special requirements. However, if the throttle is closed rapidly as when one's foot is suddenly taken from the same to apply to the brake, there is a tendency for a reverse torque to be applied by the engine and by the load and thus change the transmission sharply toward underdrive which would increase the engine braking.

Seventh, in order to permit the use of a 1 to 1 ratio or overdrive for towing to start the engine, the car is put in gear with the clutch 4 disengaged and when a speed of 12 to 15 miles per hour is reached the clutch is allowed to engage, the two reverse torque cams before mentioned now tending to hold the transmission in a 1 to 1 relation. It is necessary that a speed of 12 to 15 miles per hour be obtained before the clutch is engaged because at low speeds the transmission would tend to go to lower ratios. For example, for purposes of braking on down hill runs the car may be slowed down below 10 miles per hour with disengaged clutch and then the latter be engaged and the transmission will then have a low ratio which will tend to prevent excessive speed in the car in traveling down hill.

From this latter discussion it may be seen that the transmission can be practically placed in any desired ratio for braking or towing purposes, this ratio being dependent upon the speed at which the main clutch is engaged. If it is found necessary to reduce the ratio for starting purposes when the car has been stopped or in overdrive position, the gear box is thrown into neutral position by movement of the lever 68 and the engine clutch is then engaged to rotate the pulleys which will tend to bring the ratio of the transmission to low. The gear box is then engaged and the car starts from its low ratio position. It will be evident from the foregoing that my transmission has many inherent, useful characteristics which are not found in other types and also that it is entirely self-contained and is controlled by no other portion of the apparatus such as servo vacuum or electro-magnetic forces, being inherently controlled by automatic means responsive to the input and output torques and to input speed.

I claim:

1. In an automatic transmission, a drive shaft, a driven shaft, a gear unit connected to said shaft, a plurality of pulleys on each shaft each pulley having an axially movable and non-movable side, flexible belts entrained between pulley sides on the two shafts and a plurality of means on each shaft operating under and by variable conditions of speed and torque to urge the movable pulley sides toward the non-movable to give the greatest effective diameter said gear unit driven by said driven shaft providing separate step-ratio speed ranges established by said means.

2. In an automatic transmission having expansible pulleys on parallel shafts with transmission belts running between them, a step-ratio gear unit driven by one of said shafts, a plurality of torque and speed conscious means on the shafts all of which tend to move the sides to the expansible pulleys together upon their normal operation and a control for said unit operable to establish separate continuously variable speed ranges proportional to the ratios provided by said unit.

3. In driving apparatus, a source of power, a primary clutch, an automatically variable transmission connected to the clutch output and a gear box connected to the transmission output including a secondary direct drive disconnecting clutch whereby the said secondary clutch may be utilized to disconnect the output to the ultimate consuming means and the source of power may be likewise disconnected or connected to drive the transmission to change the ratio therein for permitting the operator to predetermine the existing ratio at which said clutch is engaged.

4. In an automatic transmission, a drive shaft, a driven shaft, a plurality of pulleys on each shaft, belts entrained on each pair of pulleys, a movable and a non-movable side on each pulley the movable sides on each shaft being secured together to operate as a unit, resilient and torque-conscious means on the driven shaft tending to force the movable toward the non-movable sides and resilient torque-conscious means coacting with speed-conscious means on the drive shaft which also tend to force the pulley sides together in normal operation whereby the driving speed ratios are constantly selected according to the combined effects of output torque, input torque and input speed.

5. In a transmission having a plurality of expansible pulleys on parallel shafts with belts entrained therein connected to a step-ratio drive unit, resilient means subject to the torques of each shaft tending to force the pulley sides together to give the largest effective diameter, one of the resilient torque-responsive means dominating the other and control means for said unit whereby the speed ratio changing effect of said means is made operative over separate speed ratio ranges.

6. In a transmission, a drive shaft, a driven shaft, a plurality of pulleys having a stationary and axially movable side on each shaft, belts for connecting the pulleys together, means connecting the movable pulley sides together on each shaft to move as a unit, torque operated cam means on both the drive and driven shaft tending to force the pulley sides together, the torque operated means on the drive shaft being resiliently preloaded the one on the driven shaft dominating under certain conditions and a speed responsive device rotating at the speed of said drive shaft operative to modify the speed ratio setting determined by said torque operated means at speeds above a given minimum.

7. In an energy transmitting device, a plurality of parallel shafts, a step-ratio geared unit driven by one of the shafts, a plurality of expansible and contractible pulleys on each shaft, belts entrained over opposite pairs of pulleys to transmit power, a plurality of means on both shafts tending to contract the pulleys to give the largest effective diameter, said means including two cam operated means, two resilient means and a speed responsive means and a selective manual control for said unit operative to establish two separate speed ratio ranges in the drive determined by said pulleys.

8. In an energy transmitting device, a plurality of parallel shafts, a plurality of expansible and contractible pulleys on each shaft, flexible means extending between the pulleys to transmit energy between the shafts, torque-conscious means on each shaft responsive to input and output torque respectively to effect expansion and contraction of said pulleys, said means each including a cam the lead of the cam on the drive shaft being greater than that on the driven shaft.

9. In an energy transmitting device, a plurality of parallel shafts, a plurality of expansible and contractible pulleys on each shaft, flexible means extending between the pulleys to transmit energy between the shafts, torque-conscious means on each shaft responsive to input and output torque respectively to effect expansion and contraction of said pulleys, said means each including a cam the lead of the cam on the drive shaft being greater than that on the driven shaft, one of said torque-conscious means being initially and resiliently preloaded.

10. In an automatic transmission, two parallel shafts, expansible and contractible pulleys on each shaft one of said shafts being connected to a load, flexible driving means extending between each pair of pulleys, a preloaded torque-conscious means on the drive shaft measuring input torque tending to contract the pulleys on that shaft and torque-conscious means on the driven shaft measuring output torque capable of dominating the first torque-conscious means under heavy load conditions and further speed ratio changing means manually operable to diminish the effect of said torque-conscious means on the driven shaft, by modification of torque multiplication between said driven shaft and the said load.

11. In an automatic transmission, a drive shaft, a plurality of expansible and contractible pulleys thereon, cam surfaces secured to the shaft, relatively movable means mounted adjacent the cam surfaces and including cams operative thereby, connecting mechanism between the pulleys and the relatively movable means whereby movement of the latter will change the effective pulley diameter, said connecting mechanism including preloaded resilient means and shock absorbing means mounted around the relatively movable means to prevent a sudden movement in one direction and automatic control means responsive to output torque effective to overcome the cam action of said cam surfaces at extreme output torques.

12. In a transmission having a plurality of movable pulley sides on a shaft, axially movable means on the shaft, cams carried thereby to cooperate with the cam surfaces, a circular plate movable on the shaft, a plurality of circumferentially spaced relatively movable preloaded members on the axially movable means adapted to contact and move the plate and means to transmit this movement to the pulley sides and means responsive to output torque of said transmission operative to overcome the action of said cams on said cam surfaces under predetermined output torque conditions.

13. In variable speed gearing drives, in combination, a power shaft and a load shaft, a continuously variable transmission unit therebetween comprising friction driving elements, means responsive to torque and speed effective to change ratio automatically in said unit, and operator-operative means arranged to selectively disconnect said unit from both the power and load shafts, whereby compelled predetermined shifts in speed ratio may be established in said unit.

14. In variable speed controls for vehicles, in combination, a power input shaft, an output shaft connected to a load, a plurality of variable speed transmission units communicating the power of said input shaft to said load, a device responsive to input torque, a second device responsive to output torque, a third device responsive to input speed, ratio shifting means for certain of said units, and connecting means operative upon said means to combine the responses of all of said devices to yield automatic shifting of speed ratio between said input and output shafts.

15. In combined friction and positive gear drives, in combination, an engine, a main clutch driven by the engine, a continuously variable friction drive unit connected to receive drive from said clutch comprising, multiple belt driving mechanism including automatic pulley diameter control devices responsive to both input speed and input and output torque, a step ratio gear unit driven by said mechanism connected to a load, and manual control means for said gear unit operative to establish selective torque multiplications between said engine and said load, whereby said first named unit changes ratio automatically for a given overall torque-speed ratio range for one setting of said means, and whereby said first named unit changes ratio automatically over a different overall torque-speed ratio for a second setting of said means.

16. In a motor vehicle, in combination, an input shaft, an output shaft, a continuously variable speed transmission unit coupling said shafts, ratio shifting means operative to shift speed ratio of said unit below and above direct drive ratio, torque responsive mechanism arranged to establish low speed settings of said means at starting and over a predetermined low speed ratio range, and a speed responsive device adapted to oppose the action of said mechanism in increasing effect at all speeds above a given speed, whereby the combination of speed and torque forces tends to maintain higher speed ratios established by said means during the driving speed ranges of the vehicle.

LESTER E. PERRINE.